April 4, 1967 — D. S. BOND — 3,312,970
PULSE ECHO RECOGNITION SYSTEMS
Filed June 27, 1941
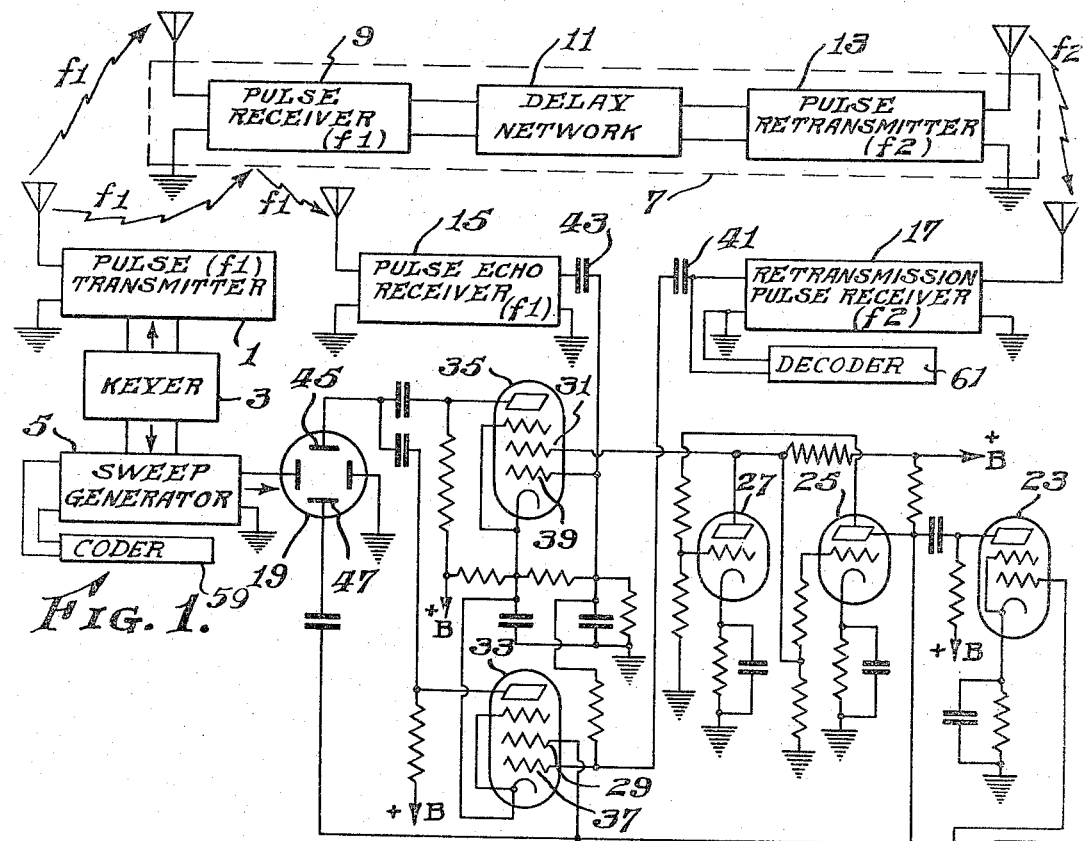
Fig. 1.
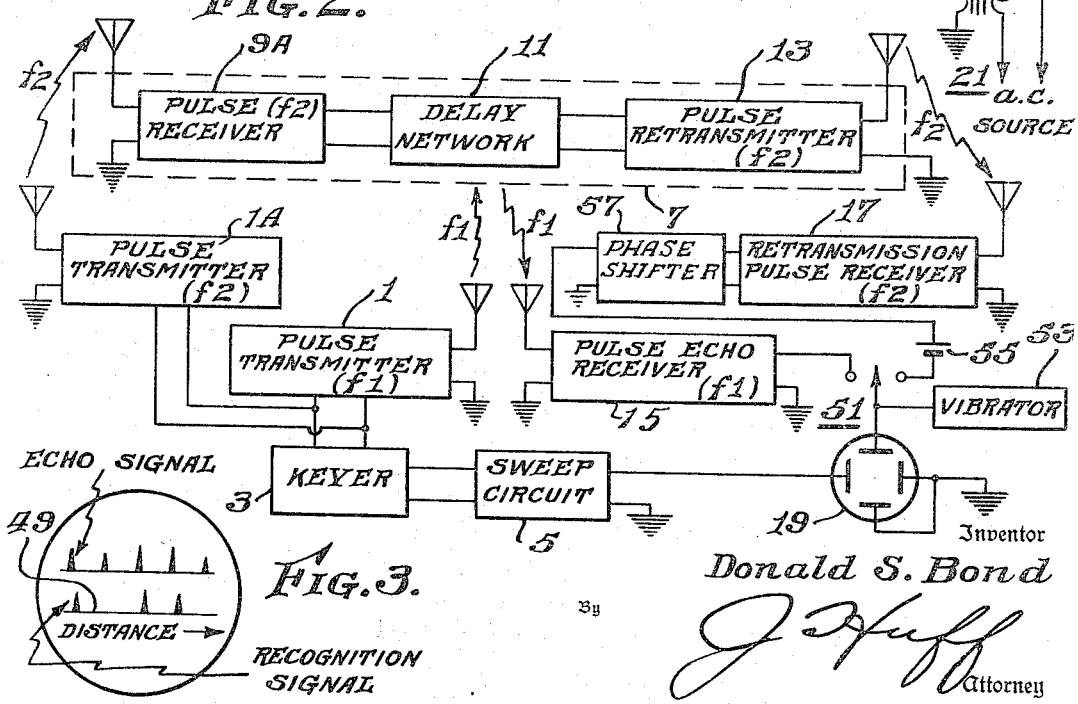
Fig. 2.
Fig. 3.
Inventor
Donald S. Bond
By
Attorney

United States Patent Office

3,312,970
Patented Apr. 4, 1967

3,312,970
PULSE ECHO RECOGNITION SYSTEMS
Donald S. Bond, Philadelphia, Pa., assignor to Radio Corporation of America, a corporation of Delaware
Filed June 27, 1941, Ser. No. 400,079
9 Claims. (Cl. 343—6)

This invention relates to pulse echo recognition systems and particularly to an improvement in pulse echo systems whereby recognition pulses and echo pulses may be separately indicated and compared.

In a pulse echo system, pulses of energy are radiated toward visible and invisible aircraft or surface craft which may be operated by friendly or unfriendly hands. The pulses are reflected by such craft and received at or near the point of radiation. The received pulses are indicated by suitable means such as a cathode ray tube provided with means for deflecting the ray as a signal function and with additional means for deflecting the ray in synchronism with the radiation of pulses. The indicator may be calibrated to indicate the pulse propagation time and hence the range or distance of the pulse reflecting objects.

Since it is normally impossible to determine from an echo signal itself if the reflected signal is from a friendly or unfriendly craft, it is desirable to provide some means for challenging and recognizing the craft. It is therefore one of the objects of the instant invention to provide improved means for challenging and recognizing craft operating within range of a pulse echo system. Another object is to provide visual means for indicating and comparing echo and recognition signals. Another object is to provide means in a pulse echo system for indicating on a single cathode ray tube echo signals and recognition signals whereby a plurality of echo signals may be compared to a plurality of identifying signals.

The invention will be described by referring to the accompanying drawing in which FIGURE 1 is a block and schematic diagram of one embodiment of the invention; FIGURE 2 is a block diagram of a modification; and FIGURE 3 is an illustration of the type of echo and recognition signal indications. Similar reference characters will be applied to similar elements in the drawing.

Referring to FIG. 1, a pulse transmitter 1, operated by a keyer 3 which is synchronized with a sweep generator 5, radiates pulses of carrier frequency $f1$ toward an aircraft or wave reflecting object represented by the dash line box 7. If the aircraft is operated by friendly hands, it is provided with a suitable reflector, or recognition transmitter, preferably operated in accordance with a prearranged secret code. The recognition transmitter may include a pulse receiver 9 which is connected through a delay network 11 to a pulse re-transmitter 13. The re-transmitter is preferably operated at a different frequency $f2$ from the frequency $f1$ of the original pulse transmitter.

The echo pulses from the craft are received on a pulse echo receiver 15 which is tuned to the pulse carrier frequency $f1$. The re-transmitted or recognition pulses are received on a re-transmission pulse receiver 17 which is tuned to the re-transmission pulse carrier frequency $f2$. The outputs from the two receivers are applied (as hereinafter described) to a cathode ray tube 19 to which the sweep circuit generator voltages are also applied.

The method of indicating the pulse echo signals and the recognition signals is as follows: The sweep voltages are applied to deflect the cathode ray along a horizontal distance scale. The output voltages from the receivers are applied alternately to the vertical deflecting electrodes. A bias voltage is applied in synchronism with the alternate output signal voltages to raise the horizontal distance scale for the echo signals and to lower the horizontal distance scale for the recognition signals.

One circuit arrangement for applying the several voltages is as follows: A switching voltage from an A.-C. source 21 is applied through an amplifier 23 to a multivibrator consisting of a pair of thermionic tubes 25, 27. The input and output circuits of the multivibrator are connected together in the usual manner so that first one, then the other tube passes anode current to form a voltage of square wave form. The anodes of the multivibrator tubes are connected respectively to control grids 29, 31 in a pair of amplifiers 33, 35. The signal control grids 37, 39 are connected through blocking capacitors 41, 43 to the output circuits of the re-transmission pulse receiver 17 and the pulse receiver 15, respectively. The anodes of the amplifiers 33, 35 are connected through blocking capacitors to one of the vertical deflecting elements 45. The bias voltage of square wave form is applied to the other vertical deflecting electrode 47 by a suitable connection to the multivibrator.

The pulse echo system proper transmits pulses which are reflected by the aircraft 7 and are received by the receiver 15. These echo pulses deflect the cathode ray vertically as shown in FIG. 3, when the multivibrator 25, 27 operates the amplifier 35 and applies a bias to move the distance trace upwardly. The re-transmitter operates after a slight delay (which prevents overloading the receiver 9 at the instant of reception) to transmit a recognition pulse. The re-transmission receiver 17 responds to the recognition signal which is applied to the cathode ray tube through the amplifier 33 at the instant the multivibrator actuates the amplifier 33 and biases the cathode ray downwardly so that it moves along the lower distance trace 49.

It should be understood that the pulse rate is inversely proportional to the distances to be measured. The switching rate, at which the pulse echo signals and the recognition signals are applied, is preferably higher than the flicker rate. While it is not necessary to synchronize the pulse transmitter and the cathode ray biasing mechanism, they may be synchronized by substituting for the separate A.-C. source 21 a frequency divider (for example as disclosed in D. G. C. Luck's United States Patent No. 2,092,887) connected to the keyer 3. Furthermore, instead of using two receivers, a single receiver of the superheterodyne type may be used. The frequency of the oscillator of the superheterodyne may be shifted by reactance tubes controlled by the square wave voltages or two oscillators may be alternately keyed to make the receiver responsive to first one $f1$ then the other $f2$ frequency.

In some uses it may be desirable to operate the pulse system proper on one carrier frequency $f1$ and the entire recognition system on a different carrier frequency $f2$, in which case a pulse transmitter 1A of FIG. 2 is added. This pulse transmitter may be operated by the keyer 3 so that recognition pulses of carrier frequency $f2$ are radiated along with the pulse echo signals $f1$. The recognition receiver 9A will be similar to that previously described but tuned to the recognition carrier frequency $f2$. While the cathode ray biasing and signal applying circuit of FIG. 1 may be employed, for sake of simplicity a two way switch 51 operated by a vibrator 53 is shown. The biasing for the two distance scales may be effected by adding a biasing battery 55 to the output circuit of one of the receivers, or the outputs of both receivers may be biased to produce separate movements of the ray along the distance scales.

If the delay in the re-transmitter system is appreciable, the recognition signals may be shifted slightly to the right. Provided similar delays are used in all the recognition systems, the shifting of the recognition signals may be overcome by including a phase shifter 57 in either the pulse receiver or the re-transmitter receiver so that the trace of each received pulse signal may be compared with the trace of the recognition signal immediately below. It should be understood that secret coding means 59, 61 may be included in the transmitters and receivers so that the recognition system will only respond to the challenge if the decoding means responds to the code. One suitable coding and decoding device is sold by the RCA Manufacturing Company, Inc., Camden, New Jersey, under the name "Selective Calling System" and is composed of Station Transmitter Coding Equipment MI–7827 and Mobile Receiver Decoding Unit MI–7632, and is described in the instruction book IB–33009. Any type of secret coding device or method may be used to make it difficult for an enemy or unfriendly craft to radiate false recognition signals in response to a challenge. It should be understood that the coding devices may be connected to the keyer 3 and the recognition pulse receiver 9 or other appropriate parts of the circuit so that the operator of the master equipment (1, 3, 5, 15, 17 and 19) may send out the challenging signals at such times as he desires.

I claim as my invention:

1. A pulse echo recognition system for air or surface craft including a station consisting of a pulse transmitter, and a pulse echo receiver, an indicator connected to said receiver for indicating the distances of pulse reflecting craft, means located on said craft for radiating from said craft pulse recognition signals in response to challenging signals from said station, means located near said station for receiving said pulse recognition signals, and means for applying said recognition signals to said indicator so that each of said distance indicating signals may be compared to each of said indicated recognition signals.

2. A pulse echo and pulse recognition system for air or surface craft including a station consisting of means for radiating pulses of energy, and means for receiving said pulses after reflection from a craft subject to challenge, means for indicating said received signals as a function of the propagation times of said pulses, means located on said craft for radiating from said craft pulse recognition signals in response to challenging signals from said station, means located near said station for receiving said recognition signals, and means for applying said recognition signals to said indicator so that the received reflected signals may be compared to the received recognition signals.

3. A pulse echo and pulse recognition system for air or surface craft including a station consisting of means for radiating pulses of energy, and means for receiving said radiated pulses after reflection from a craft subject to challenge, means connected to said receiving means for indicating said received reflected pulses as a function of the distance of the reflecting craft, means located on said craft responsive to said radiated pulses for re-transmitting pulses from said craft in response to a challenge from said station, means located near said station for receiving said re-transmitted pulses, and means for applying said received re-transmitted pulses to said indicator thereby to show which signals are responsive to said challenge by comparing the reflected signal indications and the recognition signal indications.

4. A pulse echo and pulse recognition system for air or surface craft including a station consisting of means for radiating pulses of energy, and means for receiving said radiated pulses after reflection from a craft subject to challenge, means located on said craft responsive to said radiated pulses for re-transmitting corresponding signals in response to challenge, means located near said station for receiving said re-transmitted signals, an indicator, means for applying to said indicator alternately said reflected signals and said re-transmitted signals, and means for applying to said indicator a bias voltage in synchronism with said alternate applications so that said signals are distinguishable and comparable on said indicator.

5. A pulse echo and pulse recognition system for air or surface craft including a station consisting of means for radiating pulses of energy, and means for receiving said radiated pulses after reflection from a craft subject to challenge, means located on said craft responsive to said radiated pulses for re-transmitting corresponding pulses in response to a challenge, means located near said station for receiving said re-transmitted pulses, a cathode ray tube having horizontal deflecting electrodes and vertical deflecting electrodes, a horizontal sweep voltage generator, means for operating said generator and said radiating means in synchronism, means for applying to said vertical electrodes alternately said received reflected pulses and said received re-transmitted pulses, and means for applying biasing voltages to said vertical deflecting electrodes in synchronism with said alternate pulse applications to raise and lower the horizontal trace of said ray thereby to indicate separately said reflected and re-transmitted pulses.

6. A pulse echo and pulse recognition system for air or surface craft including a station consisting of means for radiating pulses of carrier frequencies $f1$ and $f2$ respectively, and means for receiving said radiated pulses of carrier frequency $f1$ after reflection from a craft subject to challenge, means located on said craft responsive to said radiated pulses of carrier frequency $f2$ for re-transmitting pulses of carrier frequency $f2$, means located near said station for receiving said re-transmitted pulses of carrier frequency $f2$, an indicator, means for applying to said indicator alternately said reflected pulses and said re-transmitted pulses, and means for applying to said indicator a bias voltage in sychronism with said alternate application of pulses so that said reflected and re-transmitted pulses are distinguishable and comparable on said indicator.

7. A system according to claim 6 including means located on said craft and connected to the radiating means on said craft for delaying the re-transmission of said pulses of carrier frequency $f2$.

8. A system according to claim 6 including means located on said craft and connected to the radiating means on said craft for delaying the re-transmission of said pulses of carrier frequency $f2$, and means connected to at least one of said receiving means for phasing said received pulses so that the indications of said reflected and re-transmitted pulses are phased together notwithstanding said delay.

9. The method of detecting the presence of remote craft and determining whether detected craft are operated by friendly or unfriendly forces which comprises radiating a first radio wave from a reference point and receiving an echo of the first radio wave for detecting the presence of remote craft, radiating a second radio wave from said reference point in synchronism with the first radio wave, receiving said second radio wave at a friendly craft and transmitting a third radio wave therefrom, receiving the third radio wave at said reference point, and deriving from said third radio wave and said echo an indication indicative of the identity of said friendly craft and its range from said reference point.

References Cited by the Examiner

UNITED STATES PATENTS

| | | | |
|---|---|---|---|
| 2,134,716 | 11/1938 | Gunn | 250—2.3 |
| 2,143,035 | 1/1939 | Smith. | |
| 2,157,122 | 5/1939 | Dunmore | 250—2.5 |
| 2,207,267 | 7/1940 | Plaistowe | 250—2.2 |
| 2,225,046 | 12/1940 | Hunter | 250—1.32 |

CHESTER L. JUSTUS, *Primary Examiner.*

C. D. BACKUS, ARTHUR W. CROCKER, WARREN WILLNER, MELVIN H. FRIEDMAN, *Examiners.*

S. YAFFE, C. M. WHITMAN, M. A. MORRISON, T. H. TUBBESING, *Assistant Examiners.*